United States Patent
Chen et al.

(10) Patent No.: US 8,526,325 B2
(45) Date of Patent: Sep. 3, 2013

(54) DETECTING AND IDENTIFYING CONNECTIVITY IN A NETWORK

(75) Inventors: Wei Wen Chen, Ft. Collins, CO (US); Peter C. Zwetkof, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1691 days.

(21) Appl. No.: 11/701,311

(22) Filed: Jan. 31, 2007

(65) Prior Publication Data

US 2008/0181219 A1    Jul. 31, 2008

(51) Int. Cl.
- H04L 12/26    (2006.01)
- H04L 12/28    (2006.01)
- H04L 12/66    (2006.01)
- G06F 15/173    (2006.01)
- G06F 15/177    (2006.01)

(52) U.S. Cl.
USPC ...... 370/254; 370/395.31; 370/397; 370/401; 370/409; 709/220; 709/224

(58) Field of Classification Search
USPC ............... 370/254, 395.31, 397, 401, 409; 709/220, 224
See application file for complete search history.

(56) References Cited

U.S. PATENT DOCUMENTS

| | | | |
|---|---|---|---|
| 6,339,595 B1 * | 1/2002 | Rekhter et al. ........... | 370/392 |
| 6,526,056 B1 * | 2/2003 | Rekhter et al. ........... | 370/392 |
| 7,027,396 B1 * | 4/2006 | Golan et al. ............. | 370/232 |
| 7,369,556 B1 * | 5/2008 | Rekhter et al. ........... | 370/392 |
| 7,411,955 B2 * | 8/2008 | Li et al. .................. | 370/392 |
| 7,593,352 B2 * | 9/2009 | Verma ..................... | 370/255 |
| 7,865,615 B2 * | 1/2011 | Mirtorabi et al. ........ | 709/242 |
| 8,228,786 B2 * | 7/2012 | Vasseur et al. .......... | 370/219 |
| 2003/0110268 A1 | 6/2003 | Kermarec et al. | |
| 2004/0076165 A1 * | 4/2004 | Jean-Francois et al. .... | 370/400 |
| 2005/0089015 A1 * | 4/2005 | Tsuge et al. ............. | 370/351 |
| 2005/0097203 A1 | 5/2005 | Unbehagen et al. | |
| 2006/0002289 A1 | 1/2006 | Menon et al. | |
| 2006/0002409 A1 | 1/2006 | Menon et al. | |
| 2006/0029032 A1 | 2/2006 | Allan et al. | |
| 2006/0176816 A1 | 8/2006 | Roy et al. | |
| 2006/0182037 A1 | 8/2006 | Chen et al. | |
| 2006/0215578 A1 | 9/2006 | Andrapalliyal et al. | |
| 2007/0064698 A1 * | 3/2007 | Appanna ................. | 370/392 |
| 2007/0064704 A1 * | 3/2007 | Balay et al. ............. | 370/392 |
| 2007/0115962 A1 * | 5/2007 | Mammoliti et al. ..... | 370/389 |
| 2007/0183404 A1 * | 8/2007 | Hofer ..................... | 370/352 |
| 2007/0214412 A1 * | 9/2007 | Arquie et al. ........... | 715/526 |
| 2007/0217419 A1 * | 9/2007 | Vasseur .................. | 370/392 |
| 2008/0002625 A1 * | 1/2008 | Cho et al. ............... | 370/331 |
| 2008/0080517 A1 * | 4/2008 | Roy et al. ............... | 370/395.5 |
| 2008/0127316 A1 * | 5/2008 | Golan et al. ............ | 726/5 |

* cited by examiner

Primary Examiner — Alpus H Hsu (57) ABSTRACT

An automated method for ascertaining interconnectivity in a network comprises operating a customer edge device at a site that is physically linked with at least one provider edge router and communicates directly with peer sites via a virtual private network (VPN) connection. Inter-site connectivity is discovered among a plurality of customer edge devices in the network and effective communication paths among the plurality of customer edge devices across geographically distributed sites are presented.

20 Claims, 10 Drawing Sheets

DETECTING AND IDENTIFYING CONNECTIVITY IN A NETWORK

BACKGROUND OF THE INVENTION

A network service provider (NSP) can operate a provider network to supply network services, for example Virtual Private Network (VPN) services, to customers. A VPN links various customer sites enabling a customer to send multimedia data between different sites transparently over a NSP network using a suitable technology, for example Multi-Protocol Label Switching (MPLS) technology. A site network includes a router, called a customer edge (CE) on the basis of positioning at the edge of the customer sites, which communicates with the provider network. The provider network can also include multiple routers, called provider edges (PEs) on the basis of positioning at the edge of the provider network, which communicates with the CEs of the VPNs.

A virtual private network (VPN) is a private communications network that is typically used within a company, or by several companies or organizations, to communicate confidentially over a publicly accessible network. VPN message traffic can be carried via a public networking infrastructure such as the Internet in addition to various standard protocols, or via a private network of a service provider in cases where a Service Level Agreement (SLA) defines an arrangement between a VPN customer and the VPN service provider.

SUMMARY

In accordance with an embodiment of an automated method for ascertaining interconnectivity in a network, a customer edge device is operated at a site that is physically linked with at least one provider edge router and communicates directly with peer sites via a virtual private network (VPN) connection. Inter-site connectivity is discovered among a plurality of customer edge devices in the network and effective communication paths among the plurality of customer edge devices across geographically distributed sites are presented.

BRIEF DESCRIPTION OF THE DRAWINGS

Embodiments of the invention relating to both structure and method of operation may best be understood by referring to the following description and accompanying drawings.

DETAILED DESCRIPTION

In an enterprise network, different sites in private routing domains can be interconnected through virtual private networks (VPNs) forming a private wide area network (WAN) backbone for the organization. At individual sites customer edge (CE) devices are physically linked with provider edge (PE) routers but communicate directly with peer sites via a VPN connection which is typically configured by inter-domain routing policies. Generally, a customer has no access to the PE devices and a corresponding MPLS cloud. Knowledge of traffic flow among different sites is highly useful for visualizing and analyzing the health of the organization's WAN backbone. An illustrative system and method discover inter-site connectivity among CEs. A peer-to-peer connection is created for two interfaces in different CEs if two sites could communicate with one another. An aggregated cloud connection is created for interfaces on CEs that can intercommunicate.

In a particular system implementation, an illustrative system and method enables discovery of connectivity for edge routers in Border Gateway Protocol (BGP)/Multi-Protocol Label Switching (MPLS) virtual private networks (VPNs).

Various embodiments of a network system and associated operating method discover inter-connectivity among CEs in an enterprise network that is virtually linked together through transparent service provider backbone network. Discovery can present customers with identification of effective network communication paths across geographically distributed sites. In the absence of discovery information, customers have no overall visibility into the control flow of the enterprise WAN backbone, and the network management system is unable to analyze the root cause of network failures accurately. A capability to analyze root cause failures accurately speeds time to resolution for network failures, enables reduction in network down time, and increases staff efficiency.

In a VPN network management environment that is compliant with RFC 2547bis, a discovery system, due to the security and performance concerns, has no access to PEs or any other service provider device. The illustrative inter-connectivity discovery system and associated method overcome the environment constraints and enables a more efficient and accurate method to discover the connections. RFC 2547bis defines a mechanism that enables service providers to use the provider Internet Protocol (IP) backbone to provide services to customers.

Figure 1A:
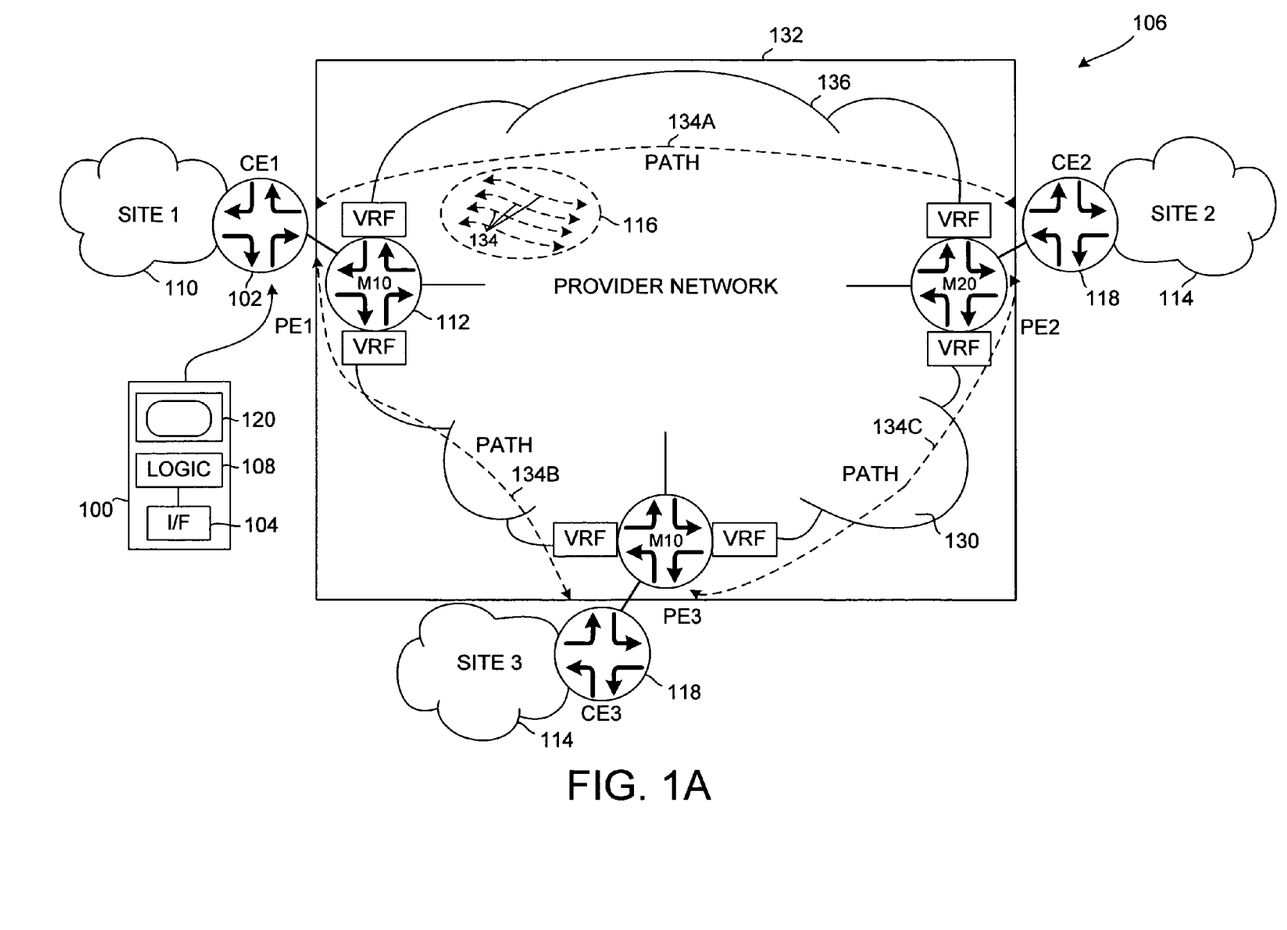
FIGS. 1A, 1B, and 1C are schematic block diagrams depicting embodiments of a network apparatus configured with a capability for automatically ascertaining interconnectivity in a network.

Referring to FIG. 1A, a schematic block diagram depicts an embodiment of a network apparatus 100 configured with a capability for automatically ascertaining interconnectivity in a network. The network apparatus 100 includes a customer edge device 102 that comprises an interface 104 configured for connecting to a network 106 and a logic 108 coupled to the interface 104. The logic 108 is configured for operating the customer edge device 102 at a site 110 that is physically linked with at least one provider edge router 112 and communicates directly with peer sites 114 via a virtual private network (VPN) connection 116. The logic 108 also operates to discover inter-site connectivity among multiple customer edge devices 118 in the network 106. The logic 108 further presents effective communication paths among the multiple customer edge devices 118 across geographically distributed sites 114.

The diagram of FIG. 1A shows an organization with three sites 102, 114 connected through WAN backbone 130 in a service provider network 132. The network apparatus 100 could discover three logical communication paths 134A,B,C among the associated CE devices 102, 118. All three logical paths can be correlated into one cloud connection 136, which presents an exact experience customers have in a VPN environment.

The backbone network 130 is the top level of a hierarchical network and connects to nodes at lower levels in the hierarchy, enabling connectivity between lower-level networks.

In an example application, the network apparatus 100 can be implemented in a suitable device as a network node manager.

The customer edge device 102 can be configured to communicate directly with the peer sites 114 via the virtual private network (VPN) connection 116 which is arranged or configured via operation of inter-domain routing procedures.

In some embodiments, the logic 108 can be configured for monitoring traffic flow among the multiple customer edge devices 118 and analyzing network health. The network apparatus 100 can further comprise a display 120 that can be coupled to the logic 108 and enabled to display the traffic flow and/or network health analysis results.

Figure 1B:
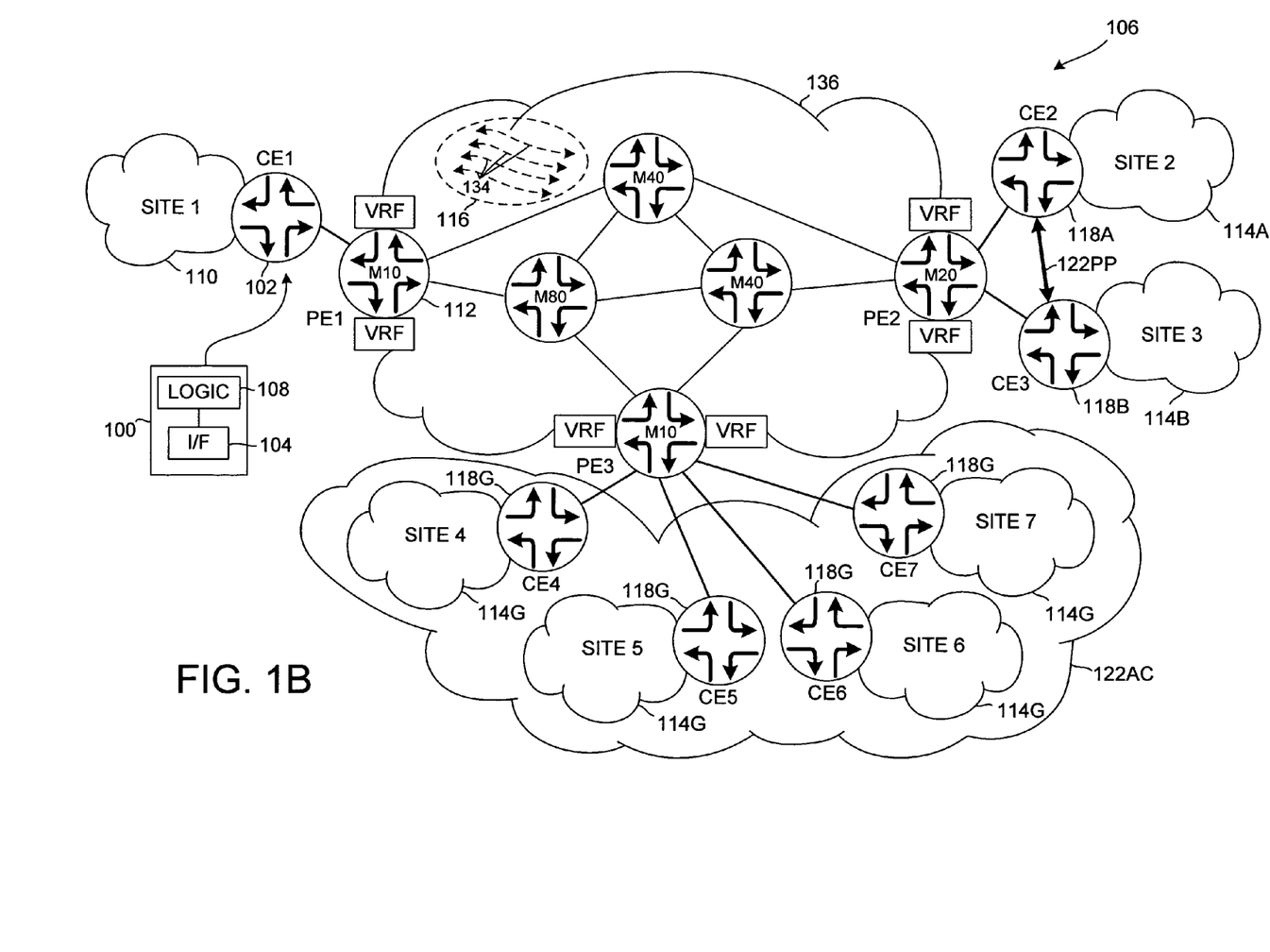

Referring to FIG. 1B, a schematic block diagram shows an embodiment of a network 106 that includes a network apparatus 100 with various network connections. The logic 108 can detect two customer edge devices 118A,B at distinct sites 114A,B that mutually intercommunicate and respond by identifying and designating the connection 122PP between the two customer edge devices 118A,B as a peer-to-peer connection. Conversely, the logic 108 can detect a group of customer edge devices 118G at sites 114G that mutually intercommunicate and respond by identifying and classifying a connection 122AC among the customer edge device group 118G as an aggregated cloud connection.

Figure 1C:
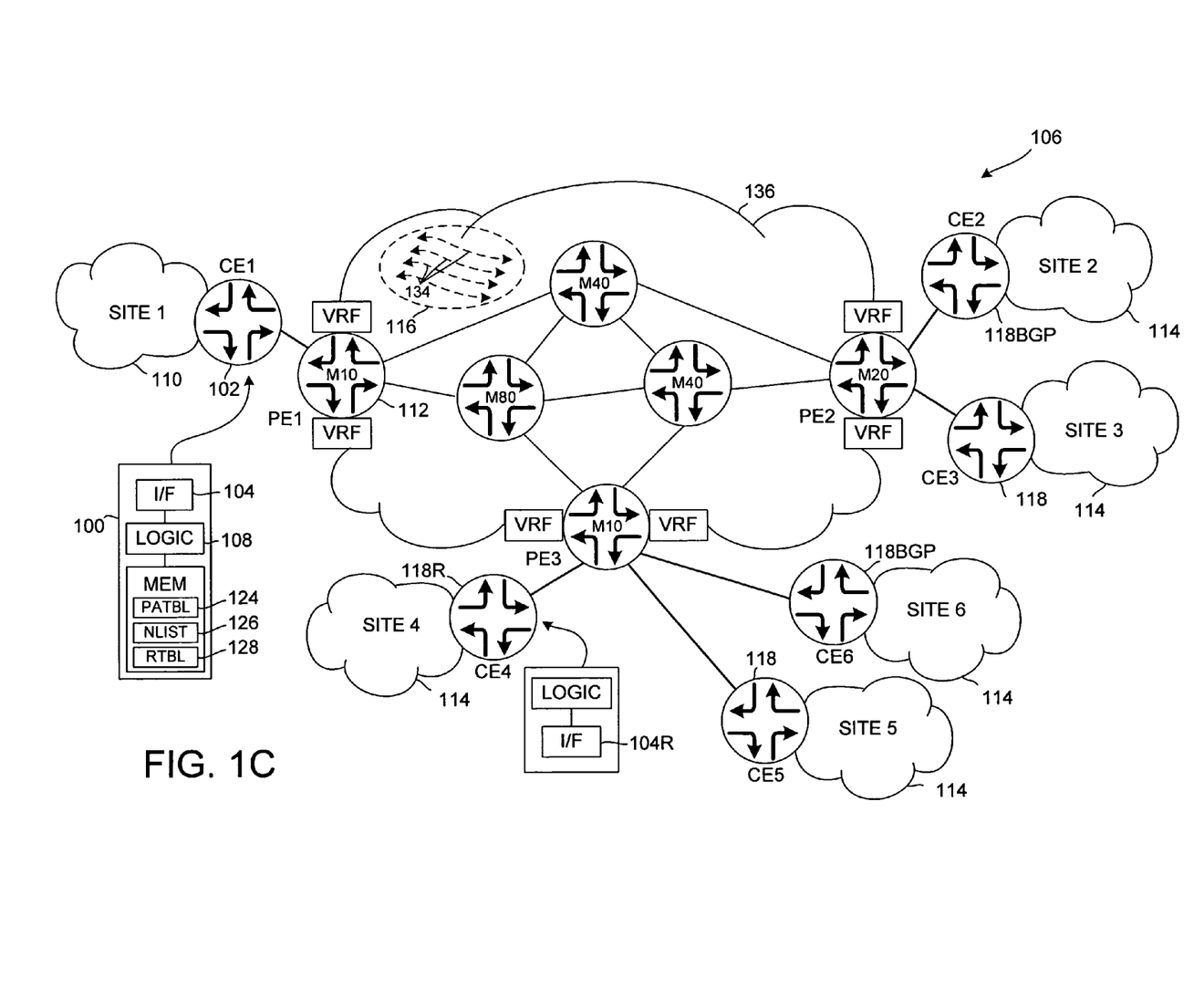

Referring to FIG. 1C, a schematic block diagram illustrates an embodiment of a network 106 configured for operating in compliance with a Border Gateway Protocol (BGP) which is a core routing protocol of the Internet. BGP operates by maintaining a table of Internet Protocol (IP) networks or prefixes which designate network reachability between autonomous systems (AS) according to a path vector protocol. According to BGP, routing decisions are determined based on path, network policies and/or rulesets. The customer edge device 102 can be configured to operate in the network 106 that has Border Gateway Protocol (BGP) enabled between the customer edge device 102 and the provider edge router 112 whereby the customer edge device 102 uses BGP advertising private routes to peer customer edge devices 118 through corresponding provider edge routers 112.

FIGS. 1A, 1B, and 1C show Virtual Routing and Forwarding (VRF) tables that are components of MPLS VPNs. The VPN service is formed by the combination of VRF tables, BGP routing, and MPLS traffic isolation. Each site PE router has a VRF associated with a particular VPN. The VPN 116 is a collection of sites that are connected at two or more PE devices and enables a secure communications channel between all devices using VRF's to segregate routing information and BGP to advertise that routing information to CE devices. The VPN 116 is depicted as a collection of paths 134 for illustrative purposes.

Various BGP implementations can be Exterior BGP (EBGP) and/or Interior BGP (IBGP). In a particular embodiment, EBGP can be presumed to be enabled between CE and PE, and the CE uses EBGP advertising private routes to interested peer CEs through corresponding PEs. IBGP may or may not be enabled on the CE. Any suitable version of BGP can be supported using the illustrative network apparatus 100, for example BGP version 4, and is commonly used in RFC2547bis VPNs.

BGP peers are typically established by manual configuration between routers to create a Transmission Control Protocol (TCP) session. A BGP speaker periodically sends keepalive messages that maintain a connection. BGP running inside an autonomous system (AS) is called Internal BGP (IBGP). iBGP routes have an administrative distance of 200. BGP running between ASs is called External BGP (EBGP) and has an administrative distance of 20. A BGP router that routes IBGP traffic is called a transit router. Routers that sit on the boundary of an AS and that use EBGP to exchange information with the ISP are border or edge routers.

In the BGP implementation, the logic 108 can be configured for accessing an autonomous system number (ASN) for one or more devices 118 to be discovered and acknowledging the devices 118BGP to be discovered as Border Gateway Protocol (BGP)-enabled when the device ASN has a non-null value. The logic 108 can access a path attribute table entry 124 for the at least one BGP-enabled device and filter the one or more BGP-enabled devices 118BGP as directed according to the path attribute table entry 124. The logic 108 can accumulate a list 126 of networks that are potentially advertised from peer customer edge devices from the filtered BGP-enabled devices 118BGP.

In some embodiments, the logic 108 can be configured to filter the BGP-enabled devices 118BGP according to path attribute table entry attributes of path segment type and path length. The logic 108 can sort the list 126 of networks according to classification of device and autonomous system number (ASN) at which the device is originated and resolves an interface 104R from which a resolved device 118R communicates with an entry in the list 126 of networks. The logic 108 identifies the entry in the list 126 of networks by look-up of routes in the list 126 of networks against a resolved device routing table 128.

In an example implementation, the logic 108 can perform filtering of advertised networks by accepting only neighboring autonomous systems (ASs) with a path length of two.

In some further embodiments, the logic 108 can be configured for repeating interface resolution for multiple resolved devices 118R and correlating communication paths for the interfaces 104R. The logic 108 can identify an aggregated cloud connection based on the correlated communication paths.

Referring to FIGS. 2A, 2B, 2C, and 2D, several schematic flow charts illustrate embodiments of automated methods for ascertaining interconnectivity in a network. In an embodiment shown in FIG. 2A, a method 200 comprises operating 202 a customer edge device at a site that is physically linked with at least one provider edge router and communicates directly with peer sites via a virtual private network (VPN) connection. Inter-site connectivity is discovered 204 among multiple customer edge devices in the network. Effective communication paths among the customer edge devices across geographically distributed sites are presented 206.

Figure 2A:
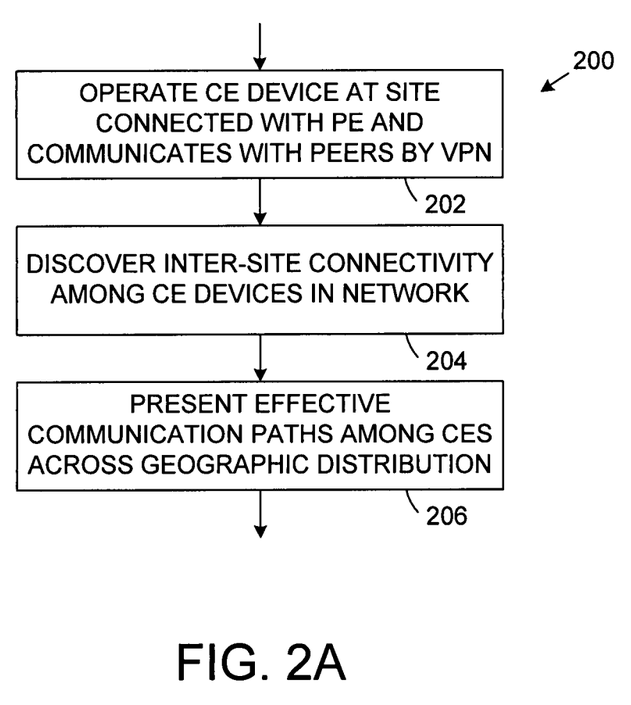
FIGS. 2A, 2B, 2C, and 2D are schematic flow charts illustrating embodiments of automated methods for ascertaining interconnectivity in a network.

In some embodiments, the customer edge device can be operated 202 to communicate directly with the peer sites via the virtual private network (VPN) connection which is configured by inter-domain routing procedures.

Figure 2B:
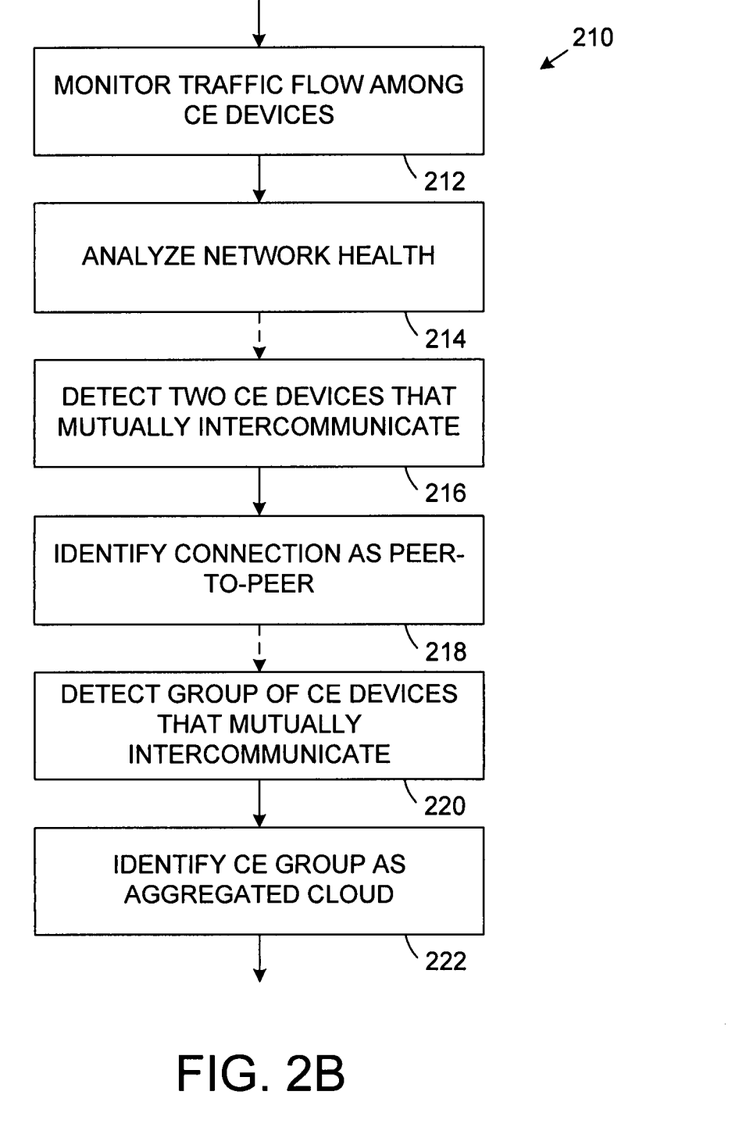

Referring to FIG. 2B, an embodiment of a interconnectivity determination method 210 can further comprise monitoring 212 traffic flow among the customer edge devices and analyzing 214 network health.

In some embodiments and network arrangements, two customer edge devices can be detected 216 at distinct sites that mutually intercommunicate. The connection between the two customer edge devices can be identified 218 as a peer-to-peer connection.

Also in some embodiments and network configurations, a group of customer edge devices can be detected 220 that mutually intercommunicate. The connection among the customer edge device group can be identified 222 as an aggregated cloud connection.

Figure 2C:
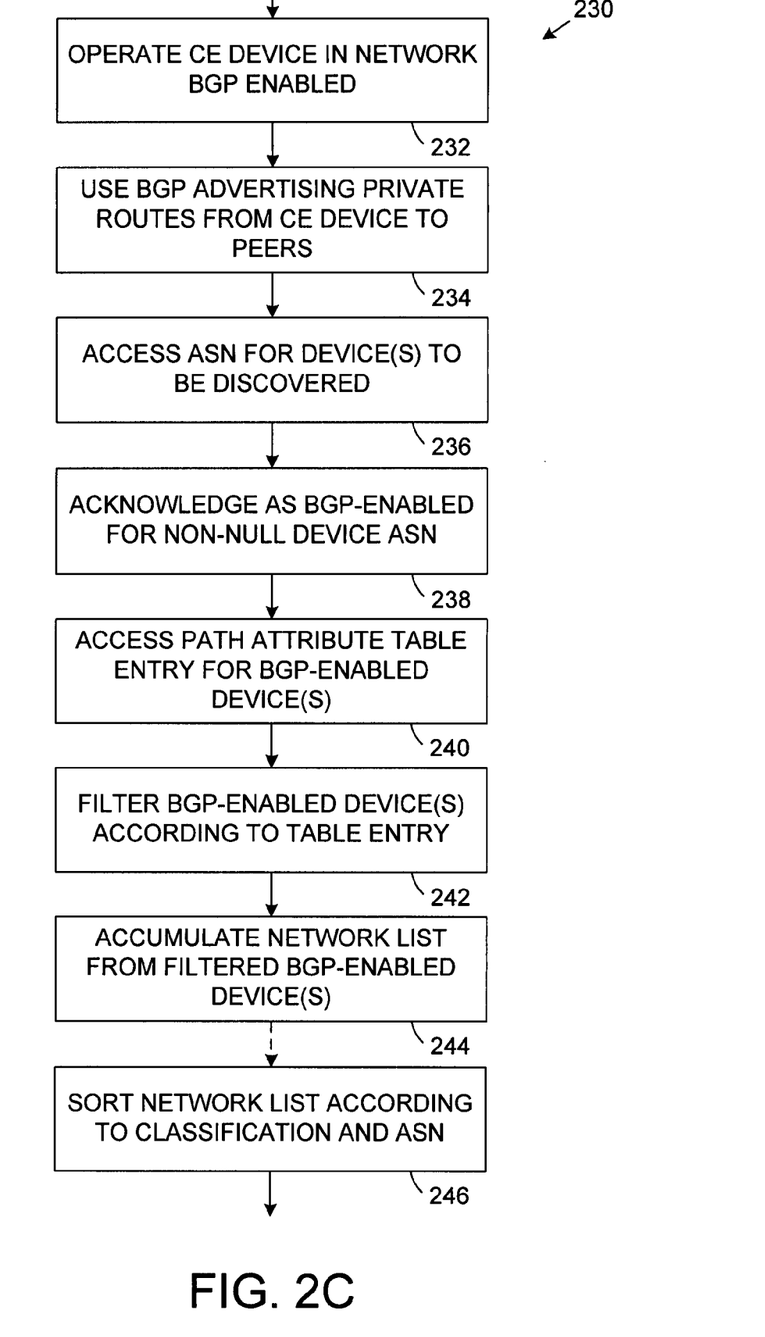

Referring to FIG. 2C, an embodiment of a interconnectivity determination method 230 can further comprise operating 232 the customer edge device in the network that has Border Gateway Protocol (BGP) enabled between the customer edge device and a provider edge router whereby the customer edge device uses 234 BGP advertising private routes to peer customer edge devices through corresponding provider edge routers.

An autonomous system number (ASN) can be accessed 236 for at least one device to be discovered and acknowledged 238 as Border Gateway Protocol (BGP)-enabled when the device ASN has a non-null value. The method 230 can further comprise accessing 240 a path attribute table entry for the one or more BGP-enabled device and filtering 242 the BGP-enabled device or devices according to the path attribute table entry. A list of networks potentially advertised from peer customer edge devices can be accumulated 244 from the filtered BGP-enabled device or devices.

In some configurations, the BGP-enabled devices can be filtered 242 according to path attribute table entry attributes of path segment type and path length.

Some arrangements can sort 246 the list of networks according to classification of device and autonomous system number (ASN) at which the device is originated.

Figure 2D:
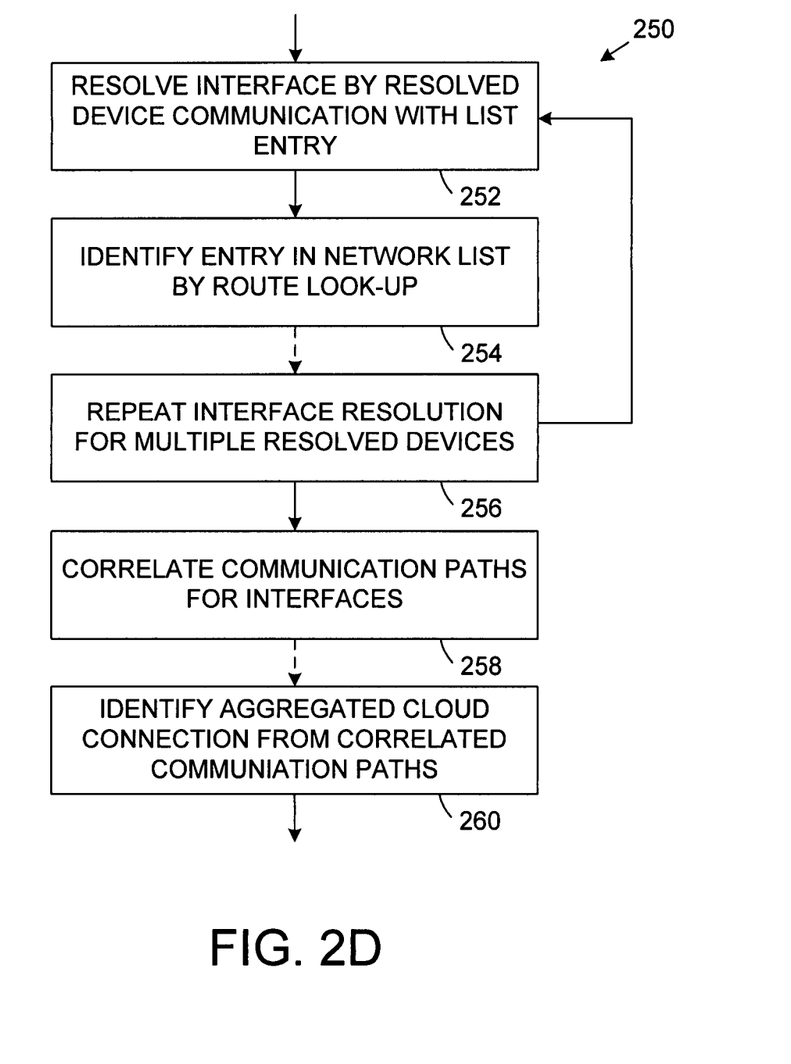

Referring to FIG. 2D, a schematic flow chart illustrates another embodiment of a connectivity determination method 250. The method can comprise resolving 252 an interface from which a resolved device communicates with an entry in the list of networks and identifying 254 the entry in the list of networks by look-up of routes in the list of networks against a resolved device routing table.

In some embodiments, interface resolution can be repeated 256 for multiple resolved devices and communication paths for the interfaces can be correlated 258.

An aggregated cloud connection can be identified 260 based on the correlated communication paths.

The illustrative inter-connectivity discovery system and associated method improve performance over a technique that presumes knowledge of routes on each CE and uses the routes to check with all peer CEs for several reasons. First, knowledge of routes on a CE may be faulty since the routes are not necessarily the advertised routes to peer CEs. For a large RFC 2547bis VPN, the technique hits a CE routing table frequently, possibly resulting in inefficiency and slow performance. Also for a large 2547bis VPN, discovery is not scalable.

Figure 3A:
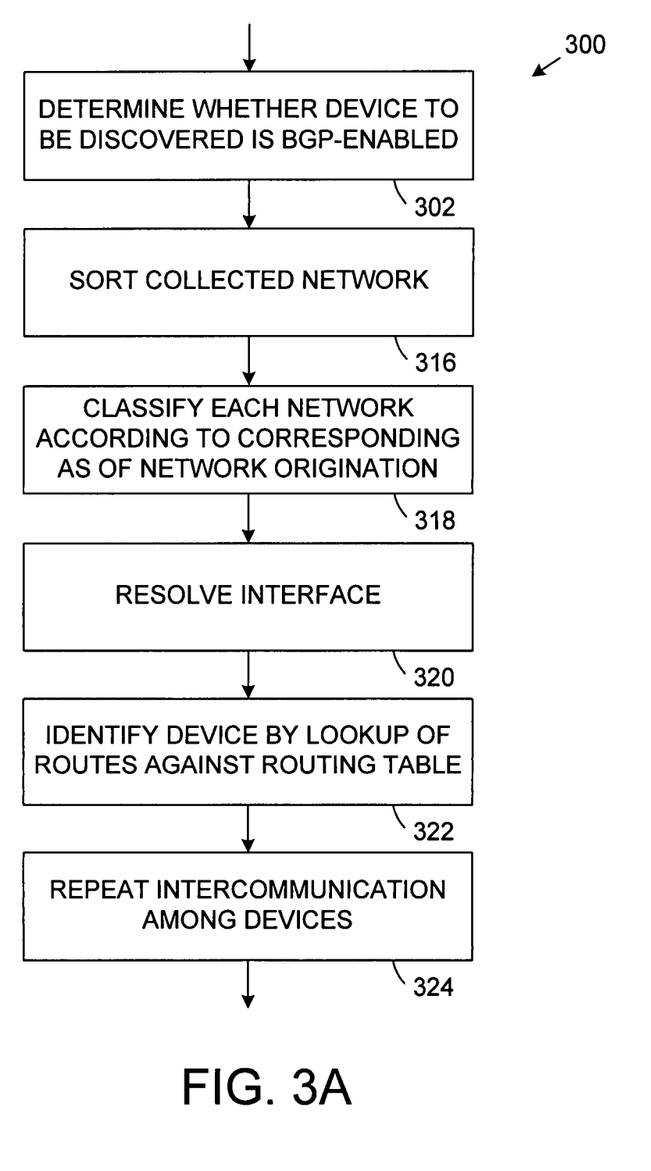
FIGS. 3A, 3B, and 3C, show a multiple-part schematic flow chart of a particular embodiment of a method for discovering inter-connectivity in a VPN deployment.
Figure 3B:
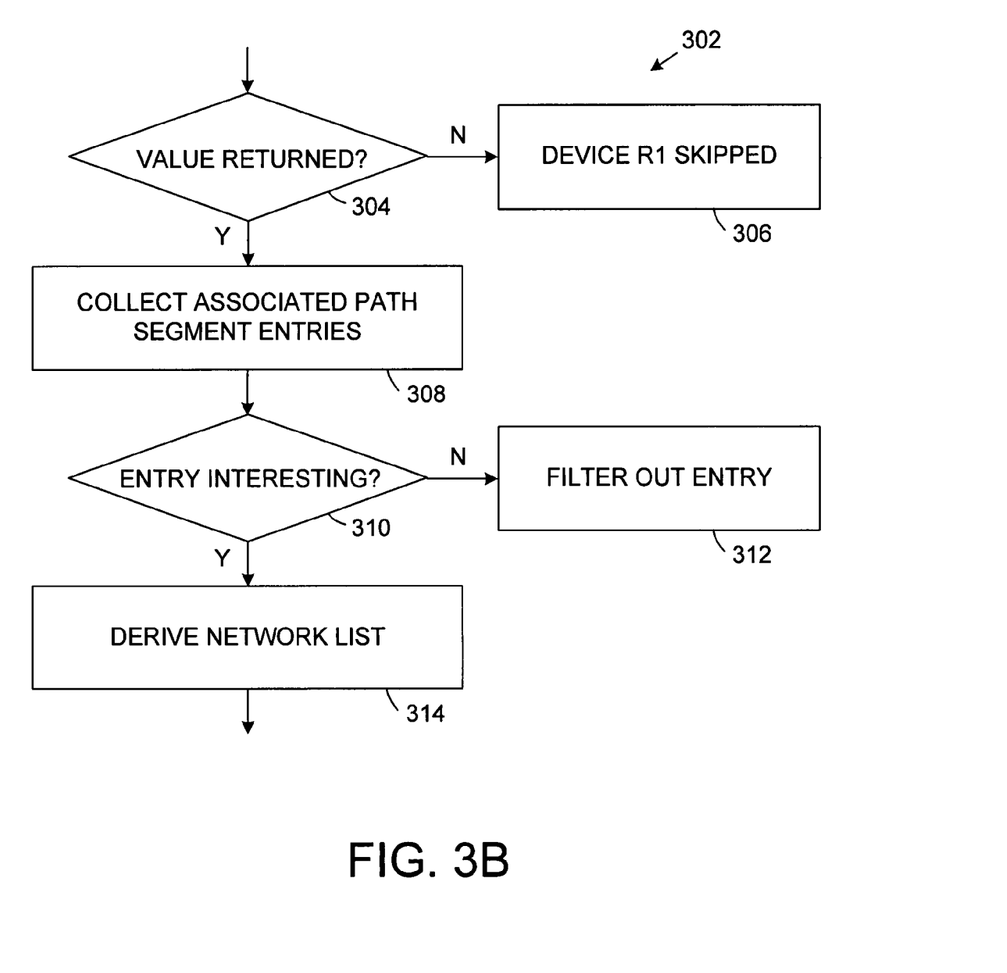
Figure 3C:
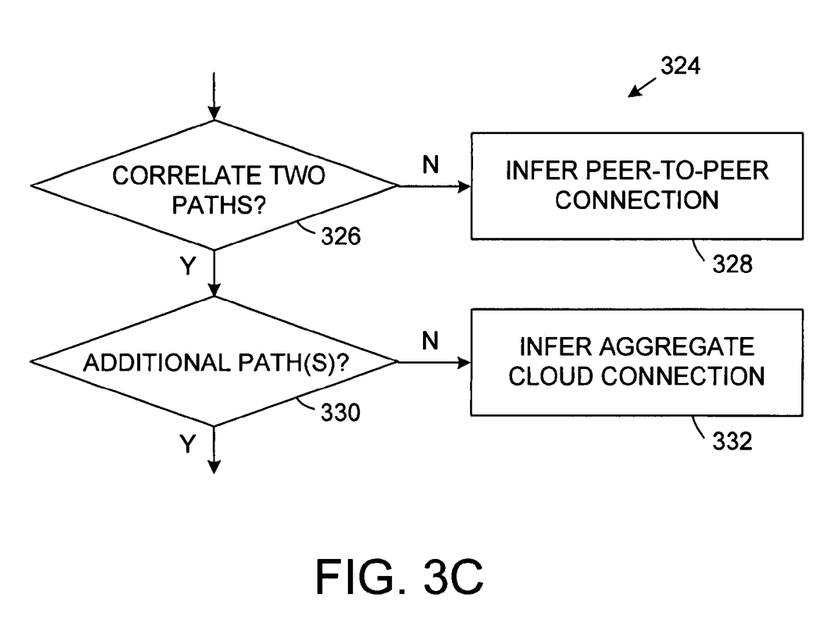

Referring to FIGS. 3A, 3B, and 3C, a schematic block diagram shows a particular embodiment of a method 300 for discovering inter-connectivity in a VPN deployment. In an illustrative embodiment, Management Information Base (MIB) RFC 1657 specifies a bgp4 PathAttrTable that contains information about paths to destination networks received from all BGP version 4 peers. One interesting entry in the table is bgp4 PathAttrASPathSegment that records the sequence of autonomous systems (AS) path segments that a network prefix has passed through from an original AS. RFC 1657 describes managed objects used for managing BGP version 4 or lower.

Management information bases (MIBs) specify management data of a device subsystem using a hierarchical namespace that contains object identifiers. MIBs enable the extensible design of SNMP.

The method 300 determines 302 whether a device R1 to be discovered is BGP4-enabled by collecting the autonomous system (AS) number A1. If no value returned 304, the device R1 is skipped 306. Otherwise, the associated bgp4 PathAttrASPathSegment entries are collected 308. Entries that are not interesting 310 are filtered out 312. Interesting entries can be defined as entries that have a Path Segment Type valued AS-SEQUENCE and path length greater than one. Filtering is used to select for small AS path length. For example, in some implementations selected path lengths can be limited to two hops. A configurable path length value can be used to break down or scope down entries that have longer AS paths. Typically, long AS path entries could be advertised from the Internet but not peer CEs. A list of networks that are potentially advertised from peer CEs in the organization is derived 314 and forms an ultimate result of the analysis. The list can be represented as N(R1). If this list is empty, this device R1 is not a CE and discovery is complete.

In an example multiprotocol label switching (MPLS) implementation, the network list can be limited to entries with routes equal to one hop. MPLS is a data-carrying mechanism that emulates some properties of a circuit-switched network over a packet-switched network and enables a unified data-carrying service for circuit-based and packet-switching clients.

The method 300 sorts 316 the collected network N(R1) and further classifies 318 each network to the corresponding AS where the network is originated. For example, the network can be sorted according to path length. In the network list, entry N(R1, A2) represents a set of networks that are heard by device R1 and are originated from AS A2. In most cases, an entry N(R, A) is typically very small.

The method 300 attempts to resolve 320 the interface from which device R1 hears the network N(R1, A2). The peer network is analyzed to determine what peers can inter-communicate. The device can be identified 322 by looking up routes in N(R1,A2) against R1 routing table to determine a ipRouteIfIndex. The lookup routing table is used by a router to determine which interface is associated with particular peers. The lookup operation can be a direct lookup based on route or destination. The routing table enables an efficient technique for gathering data. The illustrative lookup can be an instance-specific simple network management protocol (SNMP) query and should be very efficient. A returned ifIndex value i concludes that interface R1($i$) in AS A1 can communicate with devices in AS A2.

SNMP is part of the Internet Protocol (IP) suite including a protocol, a database structure specification, and a set of data objects defined by Internet Engineering Task Force (IETF) as an application layer protocol that is used by network management systems for monitoring network-attached devices in conditions that call for administrative intervention.

The process can be repeated 324 for devices in AS A2 to determine whether interface R2($j$) in AS A2 can communicate with devices in AS A1. By correlating 326 the two communication paths, a connection between R1($i$) and R2($j$) can be inferred 328.

In many cases, R1($i$) or R2($j$) can communicate with more than one peer. Assuming another connection R1($i$) and R3($m$) is established 330, an aggregated cloud connection can be created 332 for R1($i$), R2($j$), and R3($m$).

The illustrative apparatus, system, and method embodiments enable enterprise network discovery across virtual public networks (VPNs) such as RFC2547bis or other suitable VPNs, enabling customers to manage inter-connections among CEs and creating an accurate logical topology of the MPLS enterprise WAN backbone. The accurate topology picture enables performance of an accurate root cause analysis. Accurate root cause analysis decreases the mean time to resolve problems by automating the initial analysis of numerous symptoms that occur along with a primary network fault. Reducing symptoms to root cause automatically reduces the work involved in isolating the root cause of the problem and increases staff efficiency.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a few specific examples of dialogs and data models are described. The illustrative system for declarative association of dialog fields can be used with any suitable dialogs or data models. The illustrative techniques may be used with any suitable data processing configuration and with any suitable servers, computers, and devices.

What is claimed is:

1. A network apparatus comprising:
a customer edge device comprising:
an interface configured for connecting to a network; and
a logic coupled to the interface that operates the customer edge device at a site physically linked with at least one provider edge router and communicates directly with peer sites via a virtual private network (VPN) connection, discovers inter-site connectivity of established routing paths among a plurality of customer edge devices in the network wherein the routing paths are established using a predetermined routing protocol, and creates corresponding VPN communication path connections among the plurality of customer edge devices across geographically distributed sites.

2. The apparatus according to claim 1 wherein:
the customer edge device communicates directly with the peer sites via the created corresponding virtual private network (VPN) connection which is configured by inter-domain routing procedures.

3. The apparatus according to claim 1 further comprising:
the logic configured for monitoring traffic flow among the customer edge device plurality and analyzing network health; and
a display coupled to the logic and enabled to display the traffic flow and/or network health analysis results.

4. The apparatus according to claim 1 wherein:
the logic detects two customer edge devices at distinct sites that mutually intercommunicate and identifies a connection between the two customer edge devices as a peer-to-peer connection; and
the logic detects a group of customer edge devices that mutually intercommunicate and identifies a connection among the customer edge device group as an aggregated cloud connection.

5. The apparatus according to claim 1 wherein:
the customer edge device operates, in the network that has Border Gateway Protocol (BGP) enabled between the customer edge device and a provider edge router whereby the customer edge device uses BGP advertising private routes to peer customer edge devices through corresponding provider edge routers; and
the logic accesses an autonomous system number (ASN) for at least one device to be discovered; acknowledges the at least one device to be discovered as Border Gateway Protocol (BGP)-enabled when the device ASN has a non-null value; accesses a path attribute table entry for the at least one BGP-enabled device; filters the at least one BGP-enabled device according to the path attribute table entry; and accumulates a list of networks potentially advertised from peer customer edge devices from the filtered at least one BGP-enabled device.

6. The apparatus according to claim 5 wherein:
the logic filters the at least one BGP-enabled device according to path attribute table entry attributes of path segment type and path length; sorts the list of networks according to classification of device and autonomous system number (ASN) at which the device is originated; resolves an interface from which a resolved device communicates with an entry in the list of networks; and identifies the entry in the list of networks by look-up of routes in the list of networks against a resolved device routing table.

7. The apparatus according to claim 6 wherein:
the logic repeats interface resolution for a plurality of resolved devices; correlates communication paths for the interfaces; and identifies an aggregated cloud connection based on the correlated communication paths.

8. An automated method for ascertaining interconnectivity in a network comprising:
operating a customer edge device at a site that is physically linked with at least one provider edge router and communicates directly with peer sites via a virtual private network (VPN) connection;
establishing routing paths using a predetermined routing protocol;
discovering inter-site connectivity of established routing paths among a plurality of customer edge devices in the network; and
creating corresponding VPN communication path connections among the plurality of customer edge devices across geographically distributed sites.

9. The method according to claim 8 further comprising:
operating the customer edge device that communicates directly with the peer sites via the created corresponding virtual private network (VPN) connection which is configured by inter-domain routing procedures.

10. The method according to claim 8 further comprising:
monitoring traffic flow among the customer edge device plurality via the created corresponding virtual private network (VPN) connection; and
analyzing network health.

11. The method according to claim 8 further comprising:
detecting two customer edge devices at distinct sites that mutually intercommunicate; and
identifying a connection between the two customer edge devices as a peer-to-peer connection.

12. The method according to claim 8 further comprising:
detecting a group of customer edge devices that mutually intercommunicate; and
identifying a connection among the customer edge device group as an aggregated cloud connection.

13. The method according to claim 8 further comprising:
operating the customer edge device in the network that has Border Gateway Protocol (BGP) enabled between the customer edge device and a provider edge router whereby the customer edge device uses BGP advertising private routes to peer customer edge devices through corresponding provider edge routers.

14. The method according to claim 13 further comprising:
accessing an autonomous system number (ASN) for at least one device to be discovered;
acknowledging the at least one device to be discovered as Border Gateway Protocol (BGP)-enabled when the device ASN has a non-null value;
accessing a path attribute table entry for the at least one BGP-enabled device;
filtering the at least one BGP-enabled device according to the path attribute table entry; and
accumulating a list of networks potentially advertised from peer customer edge devices from the filtered at least one BGP-enabled device.

15. The method according to claim 14 further comprising:
filtering the at least one BGP-enabled device according to path attribute table entry attributes of path segment type and path length.

16. The method according to claim 14 further comprising:
sorting the list of networks according to classification of device and autonomous system number (ASN) at which the device is originated.

17. The method according to claim 16 further comprising:
resolving an interface from which a resolved device communicates with an entry in the list of networks; and
identifying the entry in the list of networks by look-up of routes in the list of networks against a resolved device routing table.

18. The method according to claim 17 further comprising:
repeating interface resolution for a plurality of resolved devices; and
correlating communication paths for the interfaces.

19. The method according to claim 18 further comprising:
identifying an aggregated cloud connection based on the correlated communication paths.

20. An article of manufacture comprising:
a controller usable medium having a computable readable program code embodied therein for automatically ascertaining interconnectivity in a network, the computable readable program code further comprising:
a code adapted to cause the controller to operate a customer edge device at a site that is physically linked with at least one provider edge router and communicates directly with peer sites via a virtual private network (VPN) connection;
a code adapted to cause the controller to establish routing paths using a predetermined routing protocol:
a code adapted to cause the controller to discover inter-site connectivity of established routing paths among a plurality of customer edge devices in the network; and
a code adapted to cause the controller to create corresponding VPN communication path connections among the plurality of customer edge devices across geographically distributed sites.

* * * * *

UNITED STATES PATENT AND TRADEMARK OFFICE
CERTIFICATE OF CORRECTION

| | | |
|---|---|---|
| PATENT NO. | : 8,526,325 B2 | Page 1 of 1 |
| APPLICATION NO. | : 11/701311 | |
| DATED | : September 3, 2013 | |
| INVENTOR(S) | : Wei Wen Chen et al. | |

It is certified that error appears in the above-identified patent and that said Letters Patent is hereby corrected as shown below:

In the Claims:

In column 8, line 22, in Claim 5, delete "operates," and insert -- operates --, therefor.

In column 10, line 32, in Claim 20, delete "protocol:" and insert -- protocol; --, therefor.

Signed and Sealed this
Eleventh Day of February, 2014

Michelle K. Lee
*Deputy Director of the United States Patent and Trademark Office*